United States Patent
Klare et al.

(10) Patent No.: US 6,228,477 B1
(45) Date of Patent: *May 8, 2001

(54) POROUS MEMBRANE STRUCTURE AND METHOD

(75) Inventors: Robert John Klare, Oxford, PA (US); David Elliot Chubin, Overland Park, KS (US)

(73) Assignee: BHA Technologies, Inc., Kansas City, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,519

(22) Filed: Feb. 12, 1999

(51) Int. Cl.$^7$ ........................................................ B32B 3/26
(52) U.S. Cl. ................. 428/315.5; 428/339; 210/500.21; 210/500.27; 210/506
(58) Field of Search ................. 428/315.5, 339; 210/500.21, 500.27, 506

(56) References Cited

U.S. PATENT DOCUMENTS

| | | |
|---|---|---|
| 4,194,041 | 3/1980 | Gore et al. . |
| 4,419,187 | 12/1983 | Cheng et al. . |
| 4,470,859 | 9/1984 | Benezra et al. . |
| 4,742,140 | 5/1988 | Greenwood et al. . |
| 5,049,275 | 9/1991 | Gillberg-LaForce et al. . |
| 5,156,780 | 10/1992 | Kenigsberg et al. . |
| 5,242,747 | 9/1993 | Wu . |
| 5,286,279 | 2/1994 | Wu . |
| 5,342,434 | 8/1994 | Wu . |
| 5,344,903 | 9/1994 | Raiford et al. . |
| 5,352,513 | 10/1994 | Mrozinski et al. . |
| 5,376,441 | 12/1994 | Wu et al. . |
| 5,385,694 | 1/1995 | Wu et al. . |
| 5,460,872 | 10/1995 | Wu et al. . |
| 5,462,586 | 10/1995 | Sugiyama et al. . |
| 5,539,047 | 7/1996 | Wu et al. . |
| 5,539,072 | 7/1996 | Wu . |
| 5,690,949 | 11/1997 | Wiemer et al. . |
| 5,738,111 | 4/1998 | Wiemer et al. . |

FOREIGN PATENT DOCUMENTS

| | | |
|---|---|---|
| 0 641 594 | 3/1995 | (EP) . |
| WO 91/01791 | 2/1991 | (WO) . |
| WO 94/22928 | 6/1994 | (WO) . |
| WO 94/13385 | 10/1994 | (WO) . |
| WO 95/26881 | 10/1995 | (WO) . |

OTHER PUBLICATIONS

MSDs Zonyl 7040.
Material Safety Data Sheet for Zonyl 7040 Fabric Protector, Ciba Speciality Chemicals Corporation, printed Oct. 28, 1998.

Zonyl fluorochemical intermediates, Technical information, DuPont Performance Chemicals, Oct. 1997.

"Zonyl" TA–N fluorochemical intermediate, Sales Specifications, DuPont Specialty Chemicals, Mar. 1996.

Zonyl Catalog fluorosurfactants, fluorointermediates, fluorinated coatings additives, DuPont Performance Chemicals, Feb. 1998.

Zonyl Fluorosurfactants, Technical Information, DuPont Performance Chemicals.

*Primary Examiner*—Helen L. Pezzuto
(74) *Attorney, Agent, or Firm*—Greg Strugalski; Lana Knedlik

(57) ABSTRACT

A composite membrane (12) comprising a membrane (16) with a structure of nodes (22) connected by fibrils (24). Surfaces of the nodes (22) and fibrils (24) define a plurality of interconnecting pores (26) that extend through the membrane (16) and between major sides (18, 20) of the membrane. The membrane (16) is made from an expanded polytetrafluoroethylene material which tends to tends to absorb oils and certain contaminating agents. The membrane (16) is moisture vapor transmissive, gas permeable and wind and liquid penetration resistant. A coating (28) is disposed on surfaces of the membrane (16) that define the pores (26). The coating (28) is made from an acrylic-based polymer with fluorocarbon side chains. The coating (28) is coalesced on surfaces of the nodes (22) and fibrils (24) to provide oil and certain contaminating agent resistance to the composite membrane (12) without completely blocking the pores (26) in the membrane (16).

A method of treating a membrane (16) comprises the steps of providing a membrane (16) with a structure of node (22) and fibrils (24). Surfaces of the nodes (22) and fibrils (24) define a plurality of pores (26) extending through the membrane (16). The membrane (16) is made from an expanded polytetrafluoroethylene material. A water-miscible dispersion of perfluoroalkyl acrylic copolymer solids in a water-miscible solvent is provided. The water-miscible dispersion has surface tension and relative contact angle properties such that the diluted dispersion is incapable of wetting the polytetrafluoroethylene material of the membrane (16). The dispersion is diluted with a water-miscible wetting agent so the diluted dispersion can wet the membrane (16). Surfaces of the nodes (22) and fibrils (24) are coated with the diluted dispersion. The wetting agent material is removed. Solids in the diluted dispersion coalesce on surfaces of the nodes (22) and fibrils (24) without completely blocking the pores (26) in the membrane (16).

9 Claims, 3 Drawing Sheets

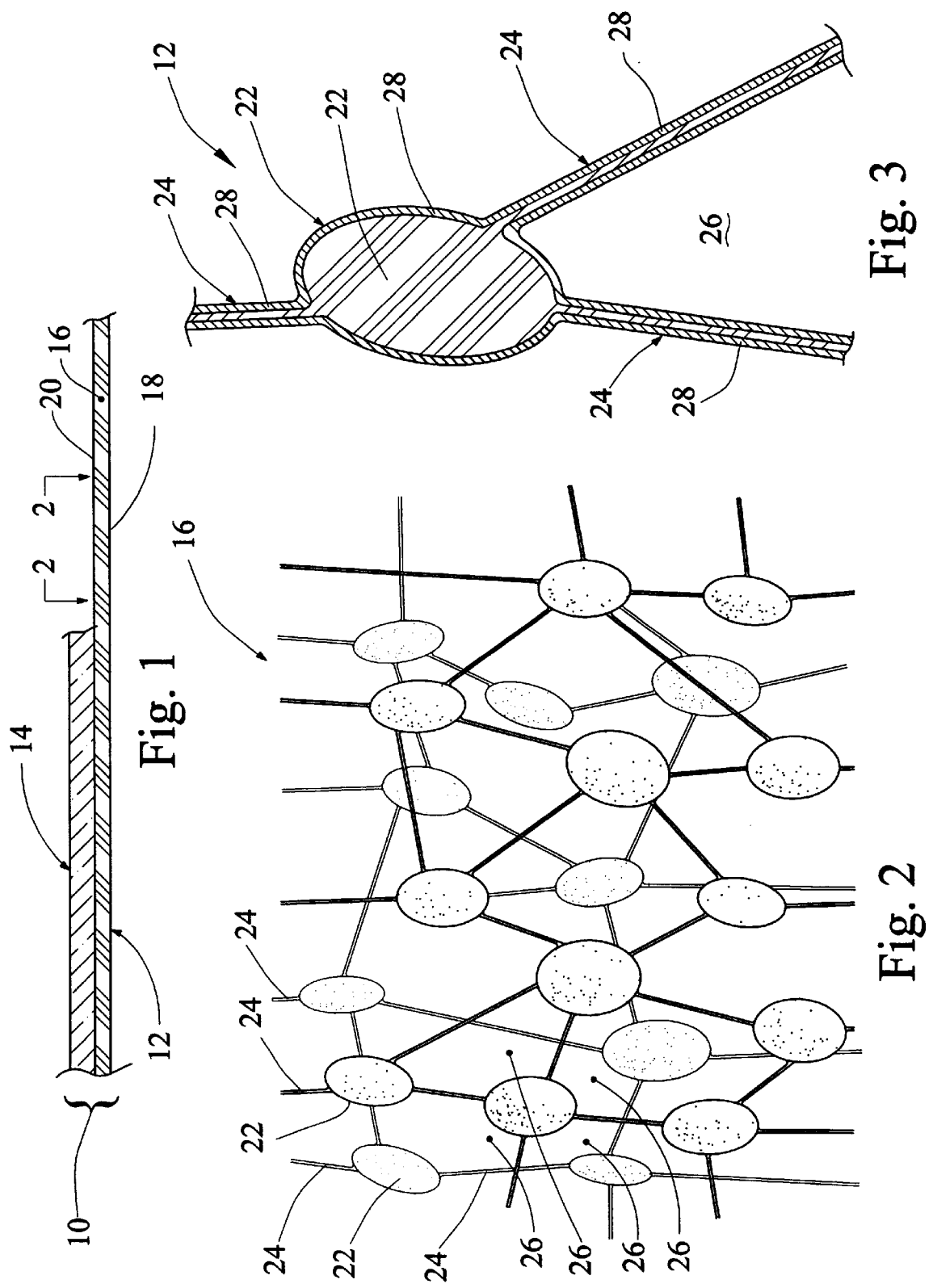

POROUS MEMBRANE STRUCTURE AND METHOD

BACKGROUND OF THE INVENTION

1. Technical Field

The present invention relates generally to a membrane and method of making the membrane. In particular, the present invention relates to a porous membrane that has a coating to provide oleophobic properties to the membrane and to a method of coating the membrane.

2. Description of the Prior Art

Various known technical fabrics are suitable for use in demanding applications. Examples of such demanding applications include filter elements, outerwear garments, tents, sleeping bags, protective garments, clean room garments, surgical drapes, surgical gowns and other types of barrier wear. The known fabrics often include a film or membrane to protect the fabric user from an external condition or environment and/or protect the external environment from contamination by the user. The film or membrane may be made from any suitable material, structure and manner.

A known material for the membrane that has proven particularly suitable for such demanding applications is made of an expanded polytetrafluoroethylene (ePTFE) material. The ePTFE membrane is typically laminated to at least one suitable material, such as a base or shell fabric. The resulting membrane and fabric laminate can then be used to manufacture any number of finished products to meet the demands of the particular application.

It is known that an ePTFE membrane is air permeable and moisture vapor transmissive, yet resistant to wind and liquid penetration at moderate pressures. However, the ePTFE membrane tends to absorb oils and certain contaminating agents, such as body oils contained in perspiration, fatty substances or detergent-like contaminants. When the ePTFE membrane becomes contaminated by absorbing oils or other contaminating agents, the membrane may no longer effectively resist liquid penetration.

One known approach at rendering an ePTFE membrane resistant to contamination by absorbing oils or contaminating agents includes applying a layer of polyurethane onto, or partially into, the ePTFE membrane, as disclosed in U.S. Pat. No. 4,194,041. A membrane with a polyurethane layer has wash durable oil and contaminating agent resistance and relatively high moisture vapor transmission rates. However, air may not freely permeate through the polyurethane layer. It is known that some degree of air permeability is desirable to increase user comfort.

Another known approach is to coat surfaces defining the pores in the membrane with a fluoroacrylate monomer, as disclosed in U.S. Pat. No. 5,156,780 then polymerize. The monomer is polymerized in situ to coat surfaces defining the pores in the membrane. This approach provides a membrane that is somewhat air permeable and resistant to absorbing oils and contaminating agents. However, this approach requires a polymerization initiator to provide the desired oleophobic properties and a specialized monomer composition. This approach also requires relatively expensive equipment and materials, such as an ultraviolet curing station and a nearly oxygen-free or inert atmosphere, to process and polymerize the monomer once it is applied to the membrane. Furthermore, this approach requires solvents that may be environmentally unsound.

Yet another known approach is to coat a microporous membrane with an organic polymer having recurring pendant fluorinated organic side chains, as disclosed in U.S. Pat. No. 5,539,072. The polymer is applied to the membrane in an aqueous dispersion. The dispersion has a relatively small particle size in the range of 0.01 to 0.10 micron so the particles can enter pores in the membrane. A relatively expensive fluorosurfactant is used in this approach. The fluorosurfactant is used in amounts that may be difficult to completely remove from the membrane.

Thus, a need exists to provide a membrane that is air permeable, moisture vapor transmissive, wind and liquid penetration resistant, durably resists absorbing oils and certain contaminating agents, is relatively inexpensive and easy to manufacture, made from readily available materials and does not require relatively expensive equipment or processes.

SUMMARY OF THE INVENTION

The present invention is directed to sheet material that is moisture vapor transmissive, air permeable, wind and liquid penetration resistant and resistant to contamination from absorbing oils and contaminating agents. The sheet material of the present invention can be in the form of numerous structures, for example a laminated fabric including a base or shell fabric laminated to a composite membrane embodying the present invention or just the composite membrane. The present invention is also directed to a method of coating the membrane.

The composite membrane embodying the present invention is relatively inexpensive and easy to manufacture, made from readily available materials and does not require relatively expensive equipment or complicated processes. The composite membrane embodying the present invention, includes a membrane having a structure of nodes connected by fibrils. Surfaces of the nodes and fibrils define a plurality of interconnecting pores extending through the membrane between major sides of the membrane. The membrane is moisture vapor transmissive, air permeable, wind and liquid penetration resistant and made from a material that tends to absorb oils and certain contaminating agents. A coating is disposed on surfaces of the nodes and fibrils that define pores in the membrane. The coating comprises an oleophobic fluoropolymer. The oleophobic fluoropolymer coating is coalesced on surfaces of the nodes and fibrils to provide resistance to oil and contaminating agents without completely blocking the pores in the membrane.

The membrane is preferably made from expanded polytetrafluoroethylene. The acrylic-based polymer with fluorocarbon side chains is preferably a perfluoroalkyl acrylic copolymer. The fluorocarbon side chains extend in a direction away from the surface of the nodes and fibrils that the coalesced oleophobic fluoropolymer coats.

The method of treating a membrane according to the present invention comprises the steps of providing a membrane with surfaces defining a plurality of pores extending through the membrane. A dispersion of an oleophobic fluoropolymer, such as an acrylic-based polymer with fluorocarbon side chains, is provided. The dispersion is diluted with a water-miscible wetting agent. The diluted dispersion wets surfaces that define pores in the membrane. The wetting agent is removed. Oleophobic fluoropolymer solids in the dispersion are coalesced on surfaces of the nodes and fibrils of the membrane to render the membrane resistant to contamination from absorbing oils and contaminating agents without completely blocking the pores.

The step of providing a membrane preferably comprises providing a microporous membrane made from expanded polytetrafluoroethylene. The step of providing a dispersion of an oleophobic fluoropolymer comprises providing a dispersion of acrylic-based polymer with fluorocarbon side chains.

The step of providing a dispersion of acrylic-based polymer with fluorocarbon side chains comprises providing a perfluoroalkyl acrylic copolymer. The step of providing a perfluoroalkyl acrylic copolymer comprises providing a water-miscible dispersion of perfluoroalkyl acrylic copolymer solids in water-miscible solvent. The coalescing step comprises heating the treated membrane.

The diluting step comprises diluting the dispersion of oleophobic fluoropolymer with a water-miscible wetting agent. The diluting step comprises diluting the dispersion at a ratio of water-miscible wetting agent to dispersion in a range of about 1:5 to 20:1. The diluted dispersion has surface tension and relative contact angle properties that enable the diluted dispersion to wet the membrane and coat surfaces defining the pores in the membrane. The diluting step further includes diluting the dispersion in a material selected from the group including ethanol, isopropyl alcohol, methanol, n-propanol, n-butanol, N-N-dimethylformamide, methyl ethyl ketone and water soluble e- and p-series glycol ethers.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic sectional view of a laminated fabric that includes a composite membrane embodying the present invention;

FIG. 2 is an enlarged schematic plan view of a portion of the membrane illustrated in FIG. 1, viewed approximately along the line 2—2 in FIG. 1;

FIG. 3 is a greatly enlarged schematic sectional view of a portion of the membrane in FIG. 2, illustrating a coating disposed on surfaces of nodes and fibrils that define pores in the membrane;

DESCRIPTION OF A PREFERRED EMBODIMENT

Figure 4:
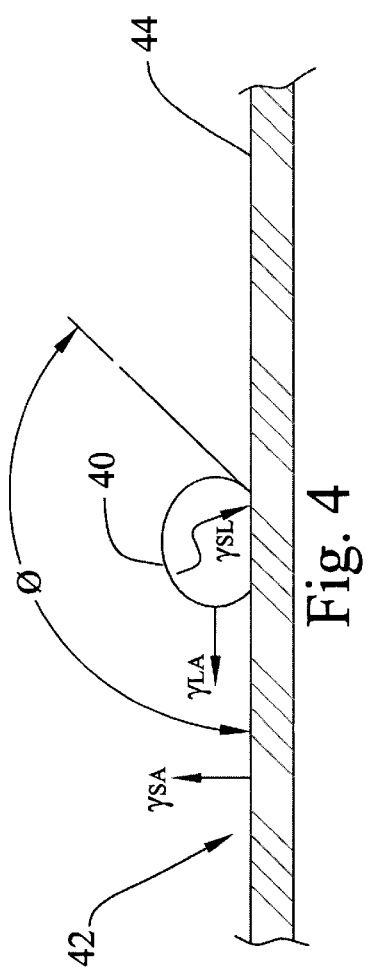
FIG. 4 is a schematic illustration of the relationship between a liquid drop and a solid.

Laminated fabric 10 (FIG. 1) incorporating a composite membrane 12, made according to the present invention, is wind and liquid penetration resistant, moisture vapor transmissive and air permeable. The laminated fabric 10 is resistant to contamination by absorbing oils and certain contaminating agents, such as body oils, fatty substances, detergent-like contaminants or perspiration that contains oil-based components. The laminated fabric 10 also includes a layer of base or shell fabric material 14 that is laminated to the composite membrane 12 by any suitable process. The shell fabric 14 may be made from any suitable material that meets performance and other criteria established for a given application in which the laminated fabric 10 will be used.

"Moisture vapor transmissive" is used to describe a membrane that readily permits the passage of water vapor through the laminated fabric 10 or composite membrane 12. The term "resistant to liquid penetration" is used to describe a membrane that is not "wet" or "wet out" by a challenge liquid, such as water, and prevents the penetration of liquid through the membrane under varying ambient conditions. The term "resistant to wind penetration" describes the ability of a membrane to prevent air penetration above more than about three (3) CFM per square foot at 0.5" of water. The term "oleophobic" is used to describe a material that is resistant to contamination by absorbing oils, greases or body fluids, such as perspiration and certain contaminating agents.

The composite membrane 12 embodying the present invention includes a membrane 16. The membrane 16 is porous, and preferably microporous, with a three-dimensional matrix or lattice type structure of numerous nodes 22 (FIG. 22) interconnected by numerous fibrils 24. The material that the membrane 16 is made from is preferably expanded polytetrafluoroethylene (ePTFE). Surfaces of the nodes 22 (FIG. 2) and fibrils 24 define numerous interconnecting pores 26 that extend through the membrane 16 between opposite major sides 18, 20 of the membrane.

By way of example, garments or other finished products incorporating the laminated fabric 10 permit moisture vapor transmission through the garment. Moisture vapor typically results from perspiration. The garment or finished product permits moisture vapor transmission at a rate sufficient for the user to remain dry and comfortable during use in most conditions. The laminated fabric 10 is also resistant to liquid and wind penetration, while being air permeable. The membrane 16 has a tendency to become contaminated by absorbing certain contaminating materials such as oils, body oils in perspiration, fatty substances or detergent-like surfactants. When the membrane 16 becomes contaminated, resistance to liquid penetration may be lost.

In the course of experimentation it was found that a membrane 16 could be coated with an oleophobic fluoropolymer material in such a way that enhanced oleophobic and hydrophobic properties result without compromising its air permeability. The composite membrane 12 has a coating 28 (FIG. 3) on the membrane 16.

The coating 28 adheres to the nodes 22 and fibrils 24 that define the pores 26 in the membrane 16. The coating 28 also conforms to the surfaces of most, and preferably all, the nodes 22 and fibrils 24 that define the pore 26 in the membrane 16. The coating 28 improves the oleophobicity of the membrane 16 by resisting contamination from absorbing of contaminating materials such as oils, body oils in perspiration, fatty substances, detergent-like surfactants and other contaminating agents. The composite membrane 12 embodying the present invention remains durably liquid penetration resistant when subjected to rubbing, touching, folding, flexing, abrasive contact or laundering.

The concept of a liquid drop 40 (FIG. 4) wetting a solid material 42 is fundamental to understanding the present invention. The physical definition of "wetting" is based on the concepts of surface energy and surface tension. Liquid molecules are attracted to one another at their surfaces. This attraction tends to pull the liquid molecules together. Relatively high values of surface tension mean that the molecules have a strong attraction to one another and it is relatively more difficult to separate the molecules. The attraction varies depending on the type of molecule. For example, water has a relatively high surface tension value because the attraction in water molecules is relatively high due to hydrogen bonding. Fluorinated polymers or fluoropolymers have a relatively low surface tension value because of the strong electronegativity of the fluorine atom.

A contact angle Ø is defined as the angle between the liquid drop 40 and a surface 44 of the solid 42 taken at the tangent edge of where the liquid drop contacts the solid surface. The contact angle is 180° when a liquid forms a spherical drop on the solid surface. The contact angle is 0° when the drop spreads to a thin film over the solid surface.

The free energy between a solid and a liquid is inversely related to the molecular attraction between the solid and the liquid. The free energy of the solid relative to a liquid is often referred to as the surface energy $\gamma_{SL}$ of the solid relative to the liquid. The free energy of liquid relative to air is normally called the surface tension of the liquid $\gamma_{LA}$. The free energy of the solid relative to air is normally referred to as the surface energy of the solid $\gamma_{SA}$. The Young-Dupre equation relates all the free energies to the contact angle as Ø:

$$\gamma_{SA} - \gamma_{SL} = \gamma_{LA} * \cos(Ø) \tag{Eq. 1}$$

The degree to which a challenge liquid may "wet" a challenged solid depends on the contact angle Ø. At a contact angle Ø of 0°, the liquid wets the solid so completely that a thin liquid film is formed on the solid. When the contact angle Ø is between 0° and 90° the liquid wets the solid. When the contact angle Ø is more than 90° the liquid does not wet the solid.

For example, consider two different liquids on a polytetrafluoroethylene (PTFE) solid surface that has a surface energy $\gamma_{SA}$ of 19 dynes/cm. One liquid, such as isopropyl alcohol (IPA) has a surface tension $\gamma_{LA}$ of 22 dynes/cm (which is a higher value than the surface energy $\gamma_{SA}$ value of the PTFE material and in theory cannot wet the PTFE material) and a relative contact angle Ø of about 43° relative to PTFE. Therefore, IPA "wets" PTFE very well. The $\gamma_{SL}$ of isopropyl alcohol relative to PTFE can now be calculated by rearranging Eq. 1 to:

$$\gamma_{SL} = \gamma_{SA} - \gamma_{LA} * \cos(Ø)$$

$$\gamma_{SL} = 19 - 22 * \cos(43°) = 3 \text{ dynes/cm}$$

Another liquid, such as deionized water has a surface tension of about 72 dynes/cm and a contact angle Ø of 112° relative to PTFE and, therefore, does not wet PTFE or is "held out." The calculated value for the surface energy $\gamma_{SL}$ of water relative to PTFE, would be 38.5 dynes/cm.

Another aspect of contact angle Ø is important. If the contact angle Ø that a given liquid makes relative to a solid is less than 90°, the liquid can be drawn into capillaries existing in even an apparently solid material. The amount of capillary force drawing the liquid into the capillary will depend on the size of the capillary. A relatively smaller capillary exerts a relatively greater force on the liquid to draw the liquid into the capillary. If the contact angle Ø is greater than 90°, there will be a force to drive the liquid out of the capillaries. The capillary force relates to the surface energy $\gamma_{SA}$ of the solid material and to the surface tension $\gamma_{LA}$ of the liquid. The capillary force drawing the liquid into the capillaries increases with the increasing surface energy $\gamma_{SA}$ of the solid. The capillary force drawing the liquid into the capillaries also increases with decreasing surface tension $\gamma_{LA}$ of the liquid.

The membrane 16 made from ePTFE contains many small interconnected capillary-like pores 26 (FIG. 2) that fluidly communicate with environments adjacent to the opposite major sides 18, 20 of the membrane. Therefore, the propensity of the ePTFE material of the membrane 16 to adsorb a challenge liquid, as well as whether or not a challenge liquid would be adsorbed into the pores 26, is a function of the surface energy $\gamma_{SA}$ of the solid, the surface tension $\gamma_{LA}$ of the liquid, the relative contact angle Ø between the liquid and solid and the size or flow area of the capillary-like pores.

The present invention is concerned primarily with a microporous ePTFE membrane 16. However, the present invention could equally apply to any porous membrane made from a material that tends to be oleophilic. Such membranes, when laminated to various shell fabrics, possess desirable liquid penetration resistance properties. Unfortunately, the ePTFE membrane 16 is susceptible to contamination by oils and certain contaminating agents, such as body oils, fatty substances, detergent-like contaminants or perspiration that contains oil-based components. When the membrane 16 becomes contaminated, the resistance to liquid penetration may be reduced or lost.

Certain polymeric oleophobic coatings can impart a relatively low surface energy $\gamma_{SA}$ to an ePTFE membrane so the relative contact angle 0 of most challenge liquids, oils and contaminating agents is greater than 90°. There are several such polymeric oleophobic coatings that appear to be suitable. One example of a suitable polymeric oleophobic coating is an acrylic-based polymer containing fluorocarbon side chains and is marketed under the Zonyl® (a du Pont trademark) name. Most of the oleophobic resins are made by dispersion and dispersion polymerization and are sold as aqueous dispersions. The oleophobic resins are typically used to treat fabrics as a durable water repellency (DWR) treatment for carpets as a dirt and stain resistant treatment. These treatments are used on fabric yarns, threads, filaments and fibers that are significantly larger in size than the nodes 22 and fibrils 24 of the membrane 16. These yarns, threads, filaments and fibers define significantly larger voids even in a tightly knit or woven fabric than the pores 26 in the membrane 16 so there is generally no problem with coating all surfaces with the DWR treatment.

The contact angle Ø of these DWR treatments relative to certain microporous membranes, such as the ePTFE membrane 16, and the surface tension $\gamma_{LA}$ of these DWR treatments are such that the DWR treatments cannot wet the ePTFE membrane enough to be drawn into the pores 26 of the membrane. Consequently, the particles or polymeric solids that are intended to coat the surfaces defining the pores 26 in the membrane 16 do not contact those surfaces and may even completely block the pores of the membrane so it is no longer air permeable. With many microporous membranes only one major side of the membrane can be coated using water dispersions of the DWR treatments. The surfaces defining the pores 26 in the membrane 16 are not coated and, thus, cannot provide the desired oleophobic properties to the membrane. It is also likely that any relatively small amount of coating that was able to attach to a major side of the membrane is not very durable and can be removed during use or laundering.

Substantially improved oleophobic properties of the microporous membrane 16 can be realized if the surfaces defining the pores 26 in the membrane and the major sides 18, 20 of the membrane are coated with an oleophobic fluoropolymer. The limiting factor has been the lack of an effective way to introduce the oleophobic fluoropolymer into the pores 26 of the membrane 16 to coat the surfaces of the nodes 22 and fibrils 24 that define the pores. The present invention provides a way to introduce an oleophobic fluoropolymer into the pores 26 of the membrane 16 to coat the surfaces of the nodes 22 and fibrils 24 that define the pores without completely blocking the pores.

It has been found that a water dispersion of oleophobic fluoropolymer resin or solids is capable of wetting the membrane 16 and entering pores 26 in a microporous membrane 16 when diluted by a water-miscible wetting agent, for example isopropyl alcohol. The diluted dispersion of oleophobic fluoropolymer has a surface tension $\gamma_{LA}$ and relative contact angle Ø that permit the diluted dispersion to wet and be drawn into the pores 26 of the membrane 16. The minimum amount of wetting agent that is required for the blend to enter the pores 26 in the membrane 16 depends on the surface tension $\gamma_{LA}$ of the diluted dispersion and the relative contact angle Ø between the diluted dispersion and the material of the microporous membrane 16. This minimum amount of wetting agent can be determined experimentally by adding drops of different blend ratios to the surface of the microporous membrane 16 and observing which concentrations are immediately drawn into the pores 26 of the membrane. Experiments were conducted to determine the appropriate amount of wetting agent and are reported below.

Liquid penetration resistance of a microporous membrane 16 may be lost if a challenge fluid or liquid can "wet" the membrane. The normally hydrophobic microporous membrane 16 loses its liquid penetration resistance when the liquid initially contacts and wets a major side 18 or 20 of the membrane and subsequently contacts and wets the surfaces defining the pores 26 in the membrane. Progressive wetting of the surfaces defining the interconnecting pores 26 occurs until the opposite major side 20 or 18 of the microporous membrane 12 is reached by the wetting or "challenge" liquid. If the challenge liquid cannot wet the microporous membrane 16, liquid repellency is retained.

To prevent or minimize the loss of resistance to liquid penetration in an ePTFE membrane, the value of the surface energy $\gamma_{SA}$ of the membrane must be lower than the value of the surface tension $\gamma_{LA}$ of the challenge liquid and the relative contact angle Ø must be more than 90°. Surface energy $\gamma_{SA}$ and surface tension $\gamma_{LA}$ values are typically given in units of dynes/cm. Examples of surface energies $\gamma_{SA}$, surface tensions $\gamma_{LA}$ and some measured contact angles Ø are listed in the table below:

| Material | Surface Energy | Surface Tension | Contact Angle |
|---|---|---|---|
| PTFE | 19 dynes/cm | | |
| tap water | | 77.5 dynes/cm | 114° |
| deionized water | | 72 dynes/cm | 112° |
| blood | | 60 dynes/cm | |
| perspiration | | 42 dynes/cm | |
| hexane | | 20.4 dynes/cm | |
| 25% Zonyl ® 7040 in IPA | | 25.3 dynes/cm | 50° |
| Zonyl ® 7040 polymer solids | | 4 dynes/cm | |
| Zonyl ® 7040 emulsion | | 35.9 dynes/cm | 79° |
| Laundry detergent mix | | 30.9 dynes/cm | |
| Acetone | | 25.4 dynes/cm | 37° |
| 30% IPA | | 29.0 dynes/cm | |
| 40% IPA | | 27.7 dynes/cm | |
| 50% IPA | | 26.8 dynes/cm | |
| 60% IPA | | 26.5 dynes/cm | |
| 70% IPA | | 25.8 dynes/cm | 43° |
| 80% IPA | | 25.0 dynes/cm | |
| 90% IPA | | 24.5 dynes/cm | |
| 100% IPA | | 23.5 dynes/cm | 24° |

The more that the surface tension $\gamma_{LA}$ of the challenge liquid is above the surface energy $\gamma_{SA}$ of the challenged material and/or the more the relative contact angle Ø is above 90°, the less likely the challenge liquid will wet the challenged material.

The use of a coalesced oleophobic fluoropolymer, such as an acrylic-based polymer with fluorocarbon side chains, to coat to the microporous membrane 16 reduces the surface energy $\gamma_{SA}$ of the composite membrane 12 so fewer challenge liquids are capable of wetting the composite membrane and enter the pores 26. The coalesced oleophobic fluoropolymer coating 28 of the composite membrane 12 also increases the contact angle Ø for a challenge liquid relative to the composite membrane. The acrylic-based polymer with fluorocarbon side chains that is used to coat the membrane 16 is preferably in the form of a water-miscible dispersion of perfluoroalkyl acrylic copolymer dispersed primarily in water, but may also contain relatively small amounts of acetone and ethylene glycol or other water-miscible solvents.

The coating 28 is disposed on and around surfaces of the nodes 22 and fibrils 24 that define the interconnecting pores 26 extending through the membrane 16. The coating 28 enhances the hydrophobic properties of the membrane 16 in addition to providing better oleophobic properties to the membrane. It is contemplated that the coating 28 may be used to treat the membrane 16 only. However, the coating 28 may also be used to treat only the shell fabric 14 as durable water repellency (DWR) treatment in a separate process or at the same time the membrane 16 is treated if the shell fabric is laminated to the membrane.

The composite membrane 12 of the present invention has a relatively high moisture vapor transmission rate (MVTR) and air permeability. It is preferable that the composite membrane 12 has a moisture vapor transmission rate (MVTR) of at least 1000 g/m²/24 hrs. and preferably at least 1500 g/m²/24 hrs. The composite membrane 12 is air permeable to a sufficient degree that a user of the composite membrane can be relatively comfortable in most conditions and even during periods of physical activity. Once a predetermined proper amount of oleophobic fluoropolymer solids was coalesced on the membrane 16, it was found that the pores 26 in the composite membrane 12 were not dramatically reduced in flow area from that of an uncoated membrane.

The membrane 16 is made by extruding a mixture of PTFE (available from du Pont under the name TEFLON®) particles and lubricant. The extrudate is then calendered. The calendered extrudate is then "expanded" or stretched to form fibrils 24 (FIG. 2) connecting the particles or nodes 22 in a three dimensional matrix or lattice type of structure, as illustrated in FIG. 2. "Expanded" means sufficiently stretched beyond the elastic limit of the material to introduce permanent set or elongation to the fibrils 24.

Other materials and methods can be used to form a suitable microporous membrane that has pores extending through the membrane. For example, other suitable materials that may be used to form a microporous membrane include polyolefin, polyamide, polyester, polysulfone, polyether, acrylic and methacrylic polymers, polystyrene, polyurethane, polypropylene, polyethylene, cellulosic polymer and combinations thereof.

Surfaces of the nodes 22 and fibrils 24 define a plurality of interconnected pores 26 that are in fluid communication with one another and extend through the membrane 16 between opposite major sides 18, 20 of the membrane. A suitable size for the pores in the membrane 16 may be in the range of 0.3 to 10 microns, and is preferably in the range of 1.0 to 5.0 microns. The membrane 16 is then heated to reduce and minimize residual stress in the membrane. The membrane 16 may be unsintered, partially sintered or fully sintered.

After the ePTFE membrane 16 is manufactured, the diluted dispersion of the oleophobic fluoropolymer is applied to the membrane to wet the surfaces of the nodes 22 and fibrils 24 that define the pores 26 in the membrane. The thickness of the coating 28 and the amount and type of fluoropolymer solids in the coating may depend on several factors. These factors include the affinity of the solids to adhere and conform to the surfaces of the nodes 22 and fibrils 24 that define the pores 26 in the membrane or whether abuse of the membrane during use and laundering may crack, dislodge, damage or disrupt the coating. After the wetting operation, substantially all of the surfaces of the nodes 22 and fibrils 24 are at least partially wetted, and preferably all the surfaces of all the nodes and fibrils are completely wetted without completely blocking pores 26 in the membrane 16.

It is not necessary that the coating 28 completely encapsulate the entire surface of a node 22 or fibril 24 or is continuous to increase oleophobicity of the membrane 16, but it is preferred. The finished coating 28 results from coalescing the oleophobic fluoropolymer solids, for example in an aqueous dispersion of acrylic-based polymer with fluorocarbon side chains diluted in a water-miscible wetting agent, on as many of the surfaces of the membrane 16 as possible. The preferred aqueous dispersion has a surface tension $\gamma_{LA}$ that is greater than the surface energy $\gamma_{SA}$ of the membrane 16 and/or a relative contact angle Ø that does not permit the aqueous dispersion to wet the pores 26 in the membrane. The aqueous dispersion is diluted in a water-miscible wetting agent material. The diluted dispersion has a surface tension $\gamma_{LA}$ and/or a relative contact angle Ø that permits the diluted dispersion to enter the pores 26 in the membrane 16 and wet the surfaces of the pores.

The oleophobic fluoropolymer solids of the diluted dispersion engage and adhere to surfaces of the nodes 22 and fibrils 24 that define the pores 26 in the membrane 16 after the wetting agent material is removed. The oleophobic fluoropolymer solids are heated on the membrane 16 to coalesce and thereby render the composite membrane 12 resistant to contamination by absorbing oils and contaminating agents. During the application of heat, the thermal mobility of the oleophobic fluoropolymer solids allows the solids to flow around the nodes 22 and fibrils 24 and form the coating 28. The fluorocarbon side chains are oriented to extend in a direction away from the coated surface of the node 22 or fibril 24. The coalesced oleophobic fluoropolymer provides a relatively thin protective coating 28 on the membrane 16 that does not completely block or "blind" the pores 26 in the composite membrane 12 which could adversely affect moisture vapor transmission or air permeability through the composite membrane. The composite membrane 12 also has improved Z-strength, that is the membrane's resistance to separate into distinct layers when a force is applied to the membrane in a direction normal to the major sides 18, 20.

The preferred aqueous dispersion of acrylic-based polymer with fluorocarbon side chains preferably also includes water, perfluoroalkyl acrylic copolymer, water soluble co-solvent and glycol. There could be other solvents, co-solvents or surfactants in the aqueous dispersion without detracting from the spirit and scope of the present invention. One family of acrylic-based polymer with fluorocarbon side chains that has shown particular suitability is the Zonyl® family of fluorine containing dispersion polymers (made by du Pont and available from CIBA Specialty Chemicals). A particularly suitable aqueous dispersion in the Zonyl® family is Zonyl® 7040. Other commercially available chemicals that may be suitable are Milliken's Millguard®, Elf Atochem Foraperle®, Asahi Glass and Chemical's Asahi-guard® or Repearl™ 8040 (available from Mistubishi) and 3Ms Scotchgard® and Scotchban® products. These chemicals are examples of "durable water repellency" (DWR) treatments typically used for textiles, fibers and fabrics but not microporous membranes.

For coating the porous membranes 16 according to the invention a compound comprising acrylic-based polymer with fluorocarbon side chains is used. The dispersion of acrylic-based polymer with fluorocarbon side chains may be diluted in a suitable wetting agent or solvent, such as ethanol, isopropyl alcohol, methanol, n-propanol, n-butanol, N-N-dimethylformamide, methyl ethyl ketone and water soluble e- and p-series glycol ethers. The dispersion is diluted to provide a ratio by weight of wetting agent to dispersion in the range of 1:5 to 20:1, and preferably 3:1 to 9:1. A particularly suitable amount of oleophobic fluoropolymer solids in the Zonyl® 7040 aqueous dispersion is up to 20 wt-%, and preferably in the range of about 14-wt % to 18 wt-%. The diluted dispersion contains oleophobic fluoropolymer solids in the range of about 1.0 wt-% to about 10.0 wt-%, and preferably 2.0 to 6.0 wt-%. The resulting diluted dispersion has surface tension $\gamma_{LA}$ and a relative contact angle Ø properties that enable the diluted dispersion to wet pores 26 in the membrane 16 and ultimately be coated with oleophobic fluoropolymer solids. The average particle size of the oleophobic fluoropolymer solids is about 0.15 micron.

Method

Figure 5:
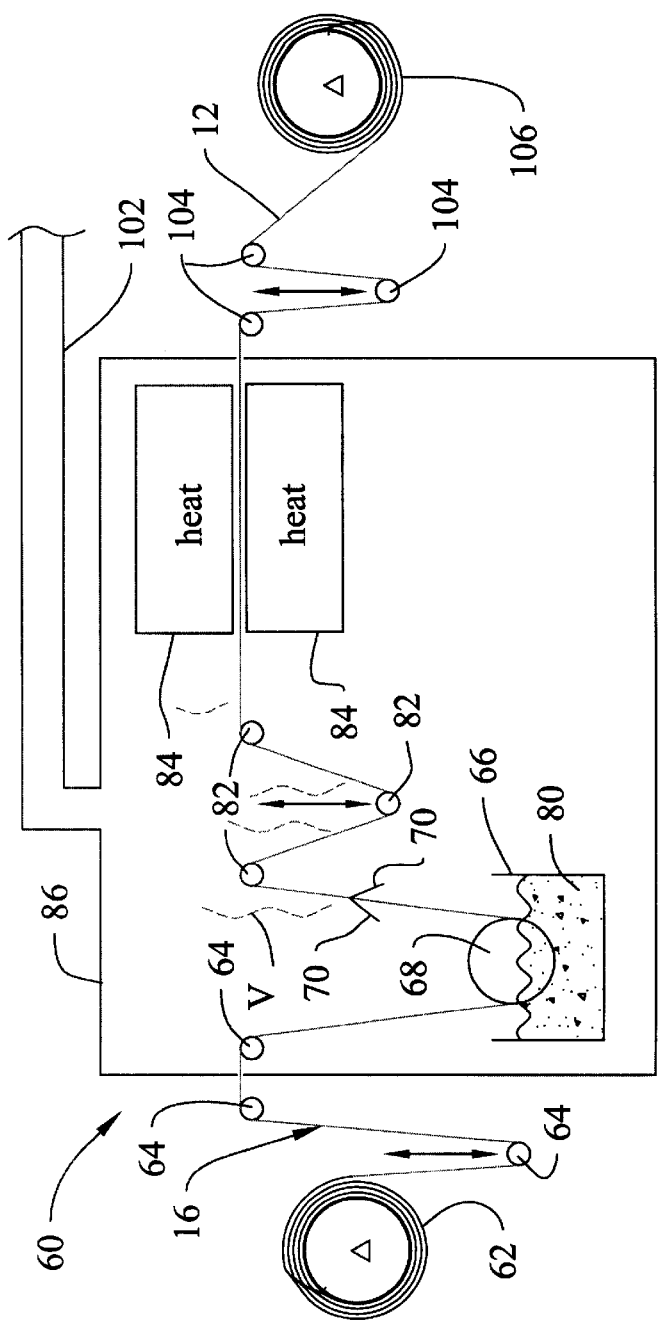
FIG. 5 is a schematic view of equipment used in the method of coating the membrane according to the present invention.

Equipment 60 for use in the method of treating the membrane 16 according to the present invention is illustrated in FIG. 5. The method includes providing the membrane 16 with surfaces defining a plurality of pores 26 extending through the membrane. Preferably, the average size of the pores 26 in the membrane 16 is sufficiently small to qualify as microporous. The membrane 16 preferably is made from expanded polytetrafluoroethylene.

The membrane 16, or alternatively the laminated fabric 10, is unreeled from a roll 62 and trained over rollers 64 and directed into a holding tank or reservoir 66 over an immersion roller 68. A diluted dispersion 80 of water-miscible acrylic-based polymer with fluorocarbon side chains is in the reservoir 66. The dispersion of acrylic-based polymer with fluorocarbon side chains is diluted in a suitable wetting agent, such as isopropyl alcohol or acetone. The dispersion of acrylic-based polymer with fluorocarbon side chains is diluted at a ratio of water-miscible wetting agent to the dispersion of acrylic-based polymer with fluorocarbon side chains in the range of 1:5 to 20:1, and preferably 3:1 to 9:1. The diluted dispersion 80 can be applied to the membrane 16 by any suitable conventional method, for example, by rollcoating, immersion (dipping), spraying, or the like. The diluted dispersion 80 impregnates the membrane 16, wets the surfaces of the nodes 22 and fibrils 24 that define the pores 26 and the surfaces that define the major sides 18, 20.

The undiluted dispersion has a surface tension $\gamma_{LA}$ and relative contact angle Ø so it cannot wet the pores 26 in the membrane 16. The diluted dispersion 80 preferably contains perfluoroalkyl acrylic copolymer solids in ethylene glycol and water diluted in a wetting agent, such as isopropyl alcohol, to a predetermined ratio. The diluted dispersion 80 has a surface tension $\gamma_{LA}$ and relative contact angle Ø so the diluted dispersion can wet all surfaces of the membrane 16. As the membrane 16 is immersed in the diluted dispersion 80, surfaces of the membrane 16 that define the pores 26 are engaged, wetted and coated by the diluted dispersion.

The wetted membrane 16 is directed out of the reservoir 66. A mechanism 70, such as a pair of squeegees or doctor blades, engages opposite major sides 18, 20 of the wetted membrane 16. The doctor blades of the mechanism 70 spread the diluted dispersion and remove excess diluted dispersion from the wetted membrane 16 to minimize the chance of blocking pores 26 in the membrane 16. Any other suitable means for removing the excess diluted dispersion may be used, such as an air knife. It is believed that the wetted membrane 16 should not engage rollers, for example nip rollers, to remove excess diluted dispersion. It is believed that the wetted membrane 16 can experience excess compression and be damaged or reduce the effectiveness of the coating treatment.

The wetted membrane 16 then exits the doctor blade mechanism 70. The wetted membrane 16 is then trained over rollers 82. The wetting agent and any other fugitive materials, such as the water, acetone and ethylene glycol in the preferred diluted dispersion, is subsequently removed by air drying or other drying methods. The wetting agent typically evaporates by itself but the evaporation can be accelerated by applying relatively low heat, for example at least to about 100° C., when IPA is the wetting agent. Wetting agent vapor V the moves away from the wetted membrane 16

The wetted membrane 16 is then directed to an oven with heat sources 84. It may be necessary or desirable to enclose or vent the reservoir 66 and heat sources 84 with a hood 86. The hood 86 may be vented to a desired location through a conduit 102. The hood 86 removes and captures the vapor V, such as, fugitive wetting agent and emulsifiers, from the wetted membrane 16 and directs the captured material to a location for storage or disposal. The heat sources 84 could each have two heating zones. The first zone would be a "drying zone" to apply relatively low heat to the wetted membrane 16 for example 100° C., to evaporate any fugitive wetting agents that have not evaporated yet. The second zone would be a "curing zone" to coalesce the oleophobic fluoropolymer solids.

The heat sources 84 apply at least 140° C. heat for at least about thirty (30) seconds to the wetted membrane 16. The heat coalesces the oleophobic fluoropolymer solids in the acrylic-based polymer with fluorocarbon side chains onto and around the surfaces of the nodes 22 and fibrils 24 to render the composite membrane 12 oil and contaminating agent resistant. The amount and duration that the heat is applied to the treated membrane 16 allows solids to coalesce and flow while the fluorocarbon side chains (not shown) orient and extend in a direction away from the surfaces of the nodes 22 and fibrils 24 that are coated. The composite membrane 12 exits the heat sources 84 and is then trained over rollers 104 and directed onto a take up reel 106.

Figure 6:
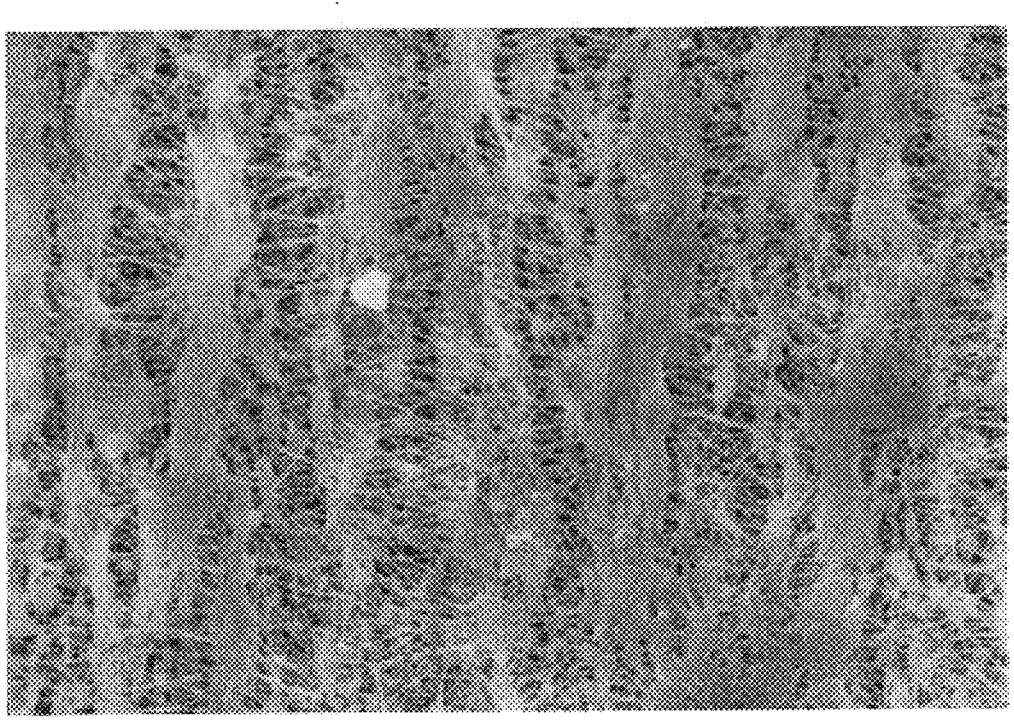
FIG. 6 is an SEM photograph of a membrane prior to the application of the coating.
Figure 7:
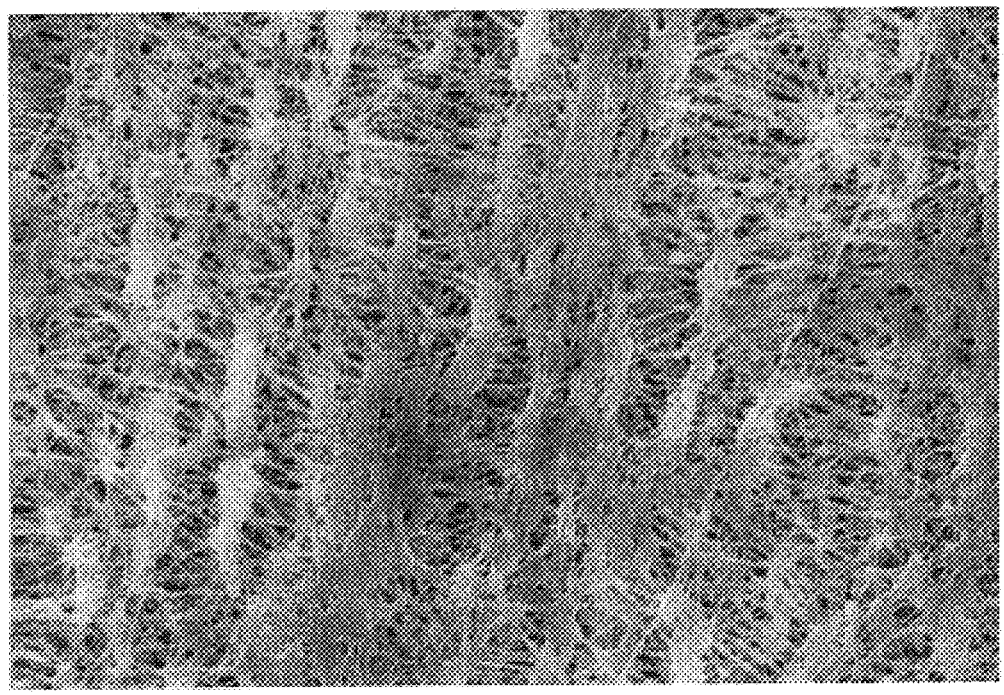
FIG. 7 is an SEM photograph of a membrane after being coated according to the present invention.

A scanning electron microscope (SEM) photograph of an uncoated membrane 16 is illustrated in FIG. 6. For comparison purposes, a composite membrane 12 embodying the present invention is illustrated in FIG. 7. The composite membrane 12 includes the same uncoated membrane 16, illustrated in FIG. 6, with the coating 28 applied. The membranes 16 (FIG. 6) and 12 (FIG. 7) are from the same production run. The SEMs are at the same magnification and it will be seen that the coated fibrils 24 have a thicker appearance due to the layer of coating 28 on the fibrils but the pores 26 in the membrane 12 are not completely blocked. The air permeability of the composite membrane 12 illustrated in FIG. 7 was 1.21 CFM per square foot as measured by a Frazier Air Permeability Tester. It will be apparent that some pores 26 in the composite membrane 12 could be blocked, but such blockage is minimal and dependent on variables in the coating process and structure of the membrane 16.

The composite membrane 12 embodying the present invention can be used in filters, outerwear garments apparel, tents, sleeping bags, protective garments, clean room garments, surgical drapes, surgical gowns and other types of barrier wear. The composite membrane 12 may be laminated or layered with other porous materials or fabrics, such as woven cloth, non-woven fabric such as non-woven scrim, or foam material. The use of such additional materials preferably should not significantly affect the wind and liquid penetration resistance, moisture vapor transmission or air permeability of the laminated fabric 10. The coating 28 is flexible and durable so the composite membrane 12 is quiet, comfortable, wash durable and has good "hand".

It is important that the composite membrane 12 remains air permeable after the oleophobic fluoropolymer solids coalesce. Depending on the material, pore size, pore volume, thickness, etc., of the porous membrane 16, some experimentation may be required to optimize the coating 28. The experimentation can address the diluted dispersion 80 with respect to solids concentration, solvent selected, etc., in order to obtain an oil- and water-repellent coating 28 that minimally influences air-permeability, yet provides the desired level of oil- and water-repellency. The experimentation can also involve other methods of applying the diluted dispersion, removing the wetting agent and coalescing the oleophobic fluoropolymer solids.

TEST DESCRIPTIONS

Moisture Vapor Transmission Rate

Moisture vapor transmission rates (MVTR) were measured using ASTM-E96-B Upright Cup Method. The test chamber was maintained at 90° F. and 50% relative humidity.

Wetting Test

A challenge liquid, such as water, is sprayed or dropped onto the surface of a sample of test material to visually assess the wet state and the extent of infiltration of the liquid into the material. When wetted and penetrated by the test liquid, the samples generally change in appearance from opaque or semi-transparent to transparent.

Other test liquids that were used include 30, 40, 50, 60, 70, 80, 90 and 100% isopropyl alcohol (IPA) in tap water.

Oil Penetration Test

A challenge oil is dropped onto the surface of a sample of test material to visually assess the wetting of the liquid into the material. When wetted by the test oil, the samples generally change in appearance from opaque or semi-transparent to transparent. The number reported is that of the highest test oil number, having the lowest surface tension $\gamma_{LA}$ value, that did not wet the test specimen.

Test oils with numbers 1–8, as described in the AATCC Technical Manual were used.

Laundering Test

Test samples were placed in a test washing machine per AATCC 135 normal cotton cycle. The test samples are then removed from the washing machine, thoroughly rinsed with water to remove the detergent solution, and air-dried.

After drying, the test piece is tested for wetting by application of drops of isopropyl alcohol (IPA) to the surfaces of the test piece representative of both the inner and outer surfaces of the folded piece. The visual observations of the wetting test are reported below.

Air Permeability Test

Air permeability is measured by a Frazier Air Permeability Tester per ASTM D737 or on a Textest FX 3300 Air Permeability Tester.

Without intending to limit the scope of the invention, the following examples demonstrate how the present invention may be practiced. Test results are provided below to demonstrate the experiments performed and the methodology used to direct the present invention.

MEMBRANE EXAMPLE 1

A microporous membrane 16 (manufactured by BHA Technologies, Inc. and designated QM006) made from expanded polytetrafluoroethylene material was used. The membrane 16 had an average pore size in the range of about 0.3 to 2.0 micron. The membrane 16 was about 0.001 inch thick. The membrane 16 is unsintered but may be partially sintered.

COATING EXAMPLE 1

The unsintered membrane 16 described above was spray coated with an undiluted amount of Zonyl® 7040 dispersion. The emulsifiers were dried off and the treated membrane was tested. The treated membrane displayed no air permeability and low MVTR. The pores in the membrane were blinded.

COATING EXAMPLE 2

Two unsintered membranes 16 described above were supported on wood hoops. The supported membranes were spray coated with the Zonyl® 7040 dispersion diluted in IPA at a ratio of 3:1, IPA to dispersion. It was surprisingly noticed that the dispersion was stable in the wetting agent and no precipitate resulted. The emulsifiers were dried off by the application of low heat for twenty to thirty minutes. The treated membranes were then heated in a forced-air oven at 150° C. for thirty minutes to coalesce the oleophobic fluoropolymer solids. The treated membranes were tested. The treated membranes displayed air permeabilities of 0.034 and 0.638 CFM per square foot. Many of the pores in the treated membranes were not blinded. The treated membrane would hold out 70% IPA and were slow to wet with 100% IPA. One of the treated membranes held out #8 test oil and the other held out #7 test oil.

COATING EXAMPLE 3

In an attempt to determine the efficacy of the coating, unsintered membranes 16 were supported on steel hoops. The supported membranes were spray coated with the Zonyl® 7040 dispersion diluted in IPA at a ratio of about 3:1, IPA to dispersion. Fugitive wetting agents were dried off by the application of low heat for three minutes. The treated membrane was heated to 150° C. for thirty minutes to coalesce the solids onto the nodes and fibrils of the treated membranes. The treated membranes were tested and the results appear in the table below.

| sample # | Ctg Wt. (g/m$^2$) | MVTR g/m$^2$/d | Air Perm CFM | Holdout IPA % |
|---|---|---|---|---|
| 3-1 | 5.61 | 1340.5 | 0.878 | 70–80 |
| 3-2 | 6.06 | 1292.6 | 0.462 | 60–70 |
| 3-3 | 5.68 | 1296.8 | 0.721 | 70 |
| 3-4 | 4.91 | 1147.5 | 0.316 | 80 |
| 3-5 | 5.05 | 1366.7 | 0.297 | 70–80 |
| 3-6 | 4.89 | 1402 | 0.48 | 70 |
| 3-7 | n/m | 1397.1 | 0.207 | 60–70 |

COATING EXAMPLE 4

In an attempt to determine the effect of time to coalesce the oleophobic fluoropolymer solids, unsintered membranes described above were supported on steel hoops. The supported membranes were spray coated with the Zonyl® 7040 dispersion diluted in IPA at a ratio of about 3:1, IPA to dispersion. Fugitive wetting agents were dried over low heat (about 65° to 75° C.). The treated membranes were heated for the test times reported below to coalesce the solids onto the nodes and fibrils of the membranes. The treated membranes were tested and the results appear in the table below. After fifty laundering cycles, the laminated fabric held out 70% IPA when the membrane side of the two layer laminate was challenged.

| sample # | Ctg Wt g/m$^2$ | Cure Time min. | Holdout IPA % | Test oil # | Air Perm CFM | MVTR g/m$^2$/day |
|---|---|---|---|---|---|---|
| 4-1 | 5.02 | 5 | 100 | 8 (part wet) | 0.258 | 1518 |
| 4-2 | 4.59 | 10 | 100 | 8 (slow wet) | 0.229 | 1541 |
| 4-3 | 4.62 | 15 | 100 | 7 | 0.242 | 1479 |
| 4-4 | 4.15 | 20 | 100 | 7 | 0.574 | 1491 |
| 4-5 | 3.99 | 25 | 100 | 8 (slow wet) | 0.295 | 1560 |
| 4-6 | 5.29 | 30 | 100 | 8 | 0.277 | 1380 |
| 4-7 | 4.65 | 0 | 60 | 8 | 0.0893 | 1349 |
| 4-8 | 0 | 0 | 30–40 | <1 | 2.17 | |

COATING EXAMPLE 5

In a further attempt to determine the effect of time to coalesce the oleophobic fluoropolymer solids, unsintered membranes described above were supported on steel hoops. The supported membranes were spray coated with the Zonyl® 7040 dispersion diluted in IPA at a ratio of about 3:1, IPA to dispersion. Fugitive wetting agent was dried off by the application of low heat for thirty minutes. The treated membrane was heated to 150° C. as reported below to coalesce the solids onto the nodes and fibrils of the treated membranes. The treated membranes were tested and the results appear in the table below.

| sample # | Ctg Wt g/m$^2$ | Cure Time min. | Holdout IPA % | Test oil # | Air Perm CFM | MVTR g/m$^2$/day |
|---|---|---|---|---|---|---|
| 5-1 | 5.05 | 5 | 100 | 8 (very slow wet) | 0.156 | 1359 |
| 5-2 | 5.21 | 10 | 100 | 8 | 0.202 | 1341 |
| 5-3 | 5.1 | 15 | 100 | 7–8 (8 part wet) | 0.221 | 1357 |
| 5-4 | 4.83 | 21 | 100 | 7 (8 part wet) | 0.056 | 1406 |
| 5-5 | 4.91 | 25 | 100 | 7 (8 part wet) | 0.149 | 1434 |
| 5-6 | 5.3 | 31 | 100 | 7 (8 part wet) | 0.204 | 1446 |

COATING EXAMPLE 6

In an attempt to determine the effect of fluoropolymer solids concentrations in the diluted dispersion, unsintered membranes described above were supported on steel hoops. The supported membranes were spray coated with the Zonyl® 7040 dispersion diluted in EPA at a ratio of about 3:1, IPA to dispersion. Fugitive wetting agent was dried off by the application of low heat for thirty minutes. The treated membrane with oleophobic fluoropolymer solids was heated to 150° C. to coalesce the solids onto the nodes and fibrils of the treated membranes. The treated membranes were tested and the results appear in the table below.

| Sample # | emulsion | Ctg. Wt. | Air Perm | test oil | 70% IPA | 100% IPA | holdout IPA % | MVTR |
|---|---|---|---|---|---|---|---|---|
| 6-1 | 20% | 4.63 g/m$^2$ | 0.627 CFM | #8 | slow wet | pw | 80 | 1453 g/m$^2$/day |
| 6-2 | 20% | 4.68 | 0.33 | 8 | slow wet | pw | 90–100 | 1424 |
| 6-3 | 20% | 4.56 | 0.417 | 6 | slow wet | pw | 50 | 1422 |
| 6-4 | 20% | 4.06 | 0.499 | 6 | slow wet | pw | 50–60 | 1378 |
| 6-5 | 15% | 3.96 | 0.298 | 6 | spotty | pw | 60 | 1381 |
| 6-6 | 15% | 3.08 | 0.524 | 7 | slow wet | pw | 80–90 | 1433 |
| 6-7 | 15% | 3.25 | 0.481 | 8 | slow wet | pw | 60–70 | 1384 |
| 6-8 | 15% | 3.15 | 0.446 | 8 | pass | wets | 80 | 1376 |
| 6-9 | 10% | 1.73 | 0.848 | 7 | slow spotty | wets | 70 | 1336 |
| 6-10 | 10% | 2.07 | 0.474 | 8 | slow spotty | wets | 80 | 1355 |
| 6-11 | 10% | 2.32 | 0.147 | 8 | pass | wets | 80 | 1332 |
| 6-13 | 5% | 1.353 | 0.5225 | 8 | slow wet | pw | 80 | 1419 |
| 6-14 | 5% | 0.7796 | 1.2 | 8 | slow wet | wets | 30 | 1383 |
| 6-15 | 5% | 0.9472 | 0.901 | 5 | spotty | wets | 60–70 | 1406 |
| 6-16 | 5% | 1.1897 | 0.702 | 4 | part wet | wets | 60 | 1441 |
| Control | | 0 | 2.02 | <1 | wets | wets | <30 | |

COATING EXAMPLE 7

In a further attempt to determine the effect of solids concentrations in the diluted dispersion, unsintered membranes described above were supported on steel hoops. The supported membranes were spray coated with the Zonyl® 7040 dispersion diluted in IPA at a ratio of about 3:1 IPA to dispersion. Fugitive wetting agent was dried off by the application of low heat for thirty minutes. The treated membrane with oleophobic fluoropolymer solids was heated to 150° C. for three minutes to coalesce the solids onto the nodes and fibrils of the treated membranes. The treated membranes were tested and the results appear in the table below.

| sample # | emulsion | Ctg. Wt. g/m$^2$ | Air Perm | test oil # | holdout IPA % | MVTR g/m$^2$/day |
|---|---|---|---|---|---|---|
| 7-1 | 10% | 2.49 | 0.295 | 8 | 80 | 1480 |
| 7-2 | 10% | 2.29 | 0.37 | 7 | 90 | 1536 |
| 7-3 | 10% | 2.15 | 0.44 | 7 | 90 | 1461 |
| 7-4 | 10% | 2.04 | 0.586 | 7 | 90 | 1515 |
| 7-5 | 15% | 2.42 | 0.428 | 8 | 90 | 1326 |
| 7-6 | 15% | 2.59 | 0.566 | 7 | 80–90 | 1323 |
| 7-7 | 15% | 3.05 | 0.496 | 7 | 90 | 1344 |
| 7-7 | 15% | 2.68 | 0.346 | 8 | 80 | 1338 |
| 7-9 | 20% | 3.34 | 0.13 | 8 | 90 | 1304 |
| 7-10 | 20% | 4.11 | 0.0035 | 8 | 90 | 1354 |
| 7-11 | 20% | 4.48 | 0.0086 | 8 | 100 | 1331 |
| 7-12 | 20% | 4.16 | 0.0013 | 8 | 90 | 1357 |
| 7-13 | 25% | 4.74 | 0.0651 | 8 | 90 | 1393 |
| 7-14 | 25% | 5.96 | 0.0059 | 8 | 100 | 1399 |
| 7-15 | 25% | 4.86 | 0.0005 | 8 | 100 | 1372 |
| 7-50-1 | | 3.267 | 1.06 | 3 | 70 | 1391 |
| 7-50-2 | | 3.461 | 0.903 | 2 | 60 | 1421 |
| Control 1 | | 0 | 1.84 | <1 | <30 | 1398 |
| Control 2 | | 0 | 1.31 | | | |

COATING EXAMPLE 8

In an attempt to determine the oleophobic fluoropolymer solids concentration limits, unsintered membranes 16 described above were supported on steel hoops. The supported membranes were spray coated with the Zonyl® 7040 dispersion diluted in IPA at a ratio of about 3:1, IPA to dispersion. Fugitive wetting agents were dried off by the application of low heat for thirty minutes. The wetted membrane with oleophobic fluoropolymer solids was heated to 150° C. for three minutes to coalesce the solids onto the nodes and fibrils of the treated membranes. The treated membranes were tested, and were re-tested for IPA resistance after a previous test with IPA and the results appear in the table below.

| sample # | % solids | Ctg. Wt. g/m$^2$ | Air Perm | holdout IPA % | Hexane | IPA rewet |
|---|---|---|---|---|---|---|
| 8-1 | 30 | 5.247 | 0.0108 | 100 | wet | spot |
| 8-2 | 40 | 6.033 | 0.0057 | 100 | wet | slow wet |
| 8-3 | 50 | 8.247 | 0.0015 | 100 | part wet | slow wet |
| 8-4 | 60 | 11.343 | 0.0005 | 100 | part wet | impervious |
| 8-5 | 70 | 15.38 | 0 | 100 | part wet | impervious |

COATING EXAMPLE 9

In a further attempt to determine the effect of oleophobic fluoropolymer solids concentrations, unsintered membranes described above were supported on steel hoops. The supported membranes were spray coated with the Zonyl® 7040 dispersion diluted in IPA at a ratio of about 3:1, IPA to dispersion. Fugitive wetting agents were air dried. The treated membrane with oleophobic fluoropolymer solids was heated to 150° C. for three to five minutes to coalesce the solids onto the nodes and fibrils of the treated membranes. The treated membranes were tested and the results appear in the table below. It appears that the lower the oleophobic fluoropolymer solids the less blocking of the pores occurs.

| sample # | % solids | air perm CFM | holdout IPA % | MVTR g/m$^2$/day |
|---|---|---|---|---|
| 9-1 | 20 | 0.569 | 60 | 1515 |
| 9-2 | 20 | 0.311 | 80–90 | 1535 |
| 9-3 | 20 | 0.14 | 60–70 | 1554 |
| 9-4 | 25 | 0.191 | 80 | 1491 |
| 9-5 | 25 | 0.02 | 70 | 1438 |
| 9-6 | 25 | 0.117 | 60 | 1367 |
| 9-7 | 30 | 0.443 | 60–70 | 1371 |
| 9-8 | 30 | 0.006 | 50–60 | 1175 |

-continued

| sample # | % solids | air perm CFM | holdout IPA % | MVTR g/m²/day |
|---|---|---|---|---|
| 9-9 | 30 | 0.044 | 70–80 | 1394 |
| Control | no treat | 2.77 | 40 | |

COATING EXAMPLE 10

In an attempt to investigate the feasibility of other potential treatments and wetting agents that might work, Zonyl® 7040 dispersion was diluted in acetone at a ratio of about 4:1 of test wetting agent to dispersion in ajar. When the diluted dispersion was mixed, it appeared to be flocculated as it had a chunky/soupy appearance. The diluted dispersion was applied to a membrane supported on a steel hoop. The diluted dispersion wet the membrane with difficulty. The membrane had many spots and areas that were not wetted out. The membrane was heated for 3 min at 150° C.

COATING EXAMPLES 11

In a further attempt to investigate the feasibility of other potential treatments and wetting agents that might work, several blends of chemicals and solvents were tested in a watch glass. The procedure was to add two drops of DWR test treatment to a watch glass. Twelve drops of test wetting agent were added to the DWR test treatment in the watch glass. The resulting blend was checked for signs of homogeneous solution, coagulation or flocculation. The results are listed below.

| Treatment | Wetting Agent | Result |
|---|---|---|
| FC ®-5102 | acetone | very badly flocculated - has grainy appearance |
| Forapearle ® 503 | acetone | flocculated, but very tiny "grains" on glass. |
| Milliguard ® 345 | acetone | badly flocculated |
| Milliguard ® 345 | IPA | Flocculated - has very fine particle size |

COATING EXAMPLES 13

In another attempt to investigate the feasibility of other potential DWR treatments that might work, several blends of chemicals were tested in ajar. Each DWR treatment was diluted in IPA. All blends were sprayed out at 3.5% solids to "normalize" each material supplied at different solids levels. All membranes were "cured" for 3 min. at 150 C. The results are listed below.

13-1 Upon diluting Zonyl® FMX (manufactured by du Pont and available from CIBA) with IPA, the solids coagulated out of solution. After standing, a clear liquid layer appeared on top. This seems to indicate the dispersion settling out. When the blend was sprayed onto membranes and the solids coalesced or cured, no air permeability was recorded and IPA% hold out was low.

13-2 Upon diluting Zonyl® 6700 (manufactured by du Pont and available from CIBA) with IPA, the solids immediately coagulated and seeded out. The blend was sprayed onto the membrane and cured, the membrane took on a matte (flat) appearance. Low air permeability was recorded and slightly better IPA% hold out than example 13-1 was recorded.

13-3 Zonyl® 8300 (manufactured by du Pont and available from CIBA) was diluted with IPA. No settling was noted, but some seedy looking precipitate was seen on the walls of the jar. The blend was sprayed onto the membrane and cured. Low air permeability was observed and good IPA resistance was recorded.

13-4 Foraperle® 503 (available from Elf Atochem) was diluted with IPA. Some precipitated solids were noted on the sides of the jar, but over not as bad as the previous examples (13-1 to 13-3). Coated membranes had mixed IPA% resistance of an average of about 40%, but showed 100% in spots.

13-5 FC®-5102 V (available from 3M®) was diluted with IPA. Much flocculation and seeding occurred. The coated membrane had matted look. IPA hold out resistance was fair (70–80%) with no air permeability.

13-6 Scotcban® FC®-829A (available from 3M®) was diluted with IPA. Scotcban® FC®-829A is an IPA soluble solution, not a dispersion. Air permeability was good. IPA hold out resistance was low. Oil penetration resistance was high. These coatings are known to have poor wash durability.

13-7 Scotchban® FC®-807 (available from 3M) was diluted with IPA. Scotcban® FC®-807 is an IPA soluble solution, not a dispersion. Air permeability was good. IPA hold out resistance was low. Oil penetration resistance was high.

COATING EXAMPLES 14

In a further attempt to investigate the feasibility of other potential treatments and wetting agents that might work, several blends of chemicals and solvents were tested in a watch glass. The procedure was to add two drops of DWR test treatment to a watch glass. Twelve drops of IPA were added to the DWR test treatment in the watch glass. The combination was stirred with a wood splinter. The resulting blend was checked for signs of homogeneous solution, coagulation or flocculation. The results are listed below.

| | |
|---|---|
| Zonyl ® FMX | appeared stable when mixed in watch glass |
| Zonyl ® 6700 | had a sandy, seedy particulate that fell out upon stirring |
| Zonyl ® 8300 | some precipitate noted |
| Forapearle 503 | some precipitate and flocculation noted |
| FC-5102 | extreme flocculation observed in watch glass |
| Scotchban ® FC-829A | soluble in IPA |
| Scotchban ® FC-807 | soluble in IPA |

If the treatment did not appear to be soluble in IPA, it was deemed a failure and no longer considered as a potential candidate to treat to coat an ePTFE membrane. If treatment failed, no other experiments were conducted on that treatment.

It is important to remember that comfort of the user of the composite membrane 12 is the prime test criteria and is difficult to quantify. However, it is believed that due to the increased air permeability of the composite membrane 12 according to the present invention user comfort is greater than heretofore known for an oleophobic, moisture vapor transmissive, wind and liquid penetration resistant membrane. From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A composite membrane comprising:
   a membrane having a structure of nodes connected by fibrils in which surfaces of said nodes and fibrils define a plurality of interconnecting pores extending through said membrane and between major sides of said membrane;
   said membrane being moisture vapor transmissive, air permeable, wind and liquid penetration resistant and made from a material tending to absorb oils and contaminating agents; and
   a conformal coating disposed on surfaces of said nodes and fibrils, said conformal coating comprising an acrylic-based polymer with fluorocarbon side chains applied from a polymer dispersion diluted with a water miscible wetting agent;
   said coating coalesced on surfaces of said nodes and fibrils to provide oil and contaminating agent resistance to said composite membrane without completely blocking the pores in said membrane.

2. The composite membrane of claim 1 wherein said membrane is made from expanded polytetrafluoroethylene.

3. The composite membrane of claim 1 wherein said acrylic-based polymer with fluorocarbon side chains comprises a perfluoroalkyl acrylic copolymer.

4. The composite membrane of claim 1 wherein said side chains extend in a direction away from said surfaces of said nodes and fibrils.

5. A composite membrane comprising:
   a membrane having a structure of nodes and fibrils in which surfaces of said nodes and fibrils define a plurality of interconnecting pores extending through said membrane and between major sides of said membrane;
   said membrane made from a polytetrafluoroethylene material which tends to absorb oils and certain contaminating surfactants, said membrane being moisture vapor transmissive, gas permeable, and wind and liquid penetration resistant; and
   a conformal coating disposed on surfaces of said nodes and fibrils defining the interconnecting passages in said membrane, said conformal coating comprising an acrylic-based polymer with fluorocarbon side chains applied from a polymer dispersion diluted with a water miscible wetting agent;
   said coating coalesced on surfaces of said nodes and fibrils to provide oil and surfactant resistance to said composite membrane without completely blocking pores in said membrane, said side chains extending in a direction away from said surfaces of said nodes and said fibrils.

6. The composite membrane of claim 5 wherein said acrylic-based polymer with fluorocarbon side chains comprises a perfluoroalkyl acrylic copolymer.

7. A composite membrane comprising:
   a membrane having a structure of nodes and fibrils in which surfaces of said nodes and fibrils define a plurality of interconnecting pores extending through said membrane and between major sides of said membrane;
   said membrane made from a polytetrafluoroethylene material which tends to absorb oils and certain contaminating surfactants, said membrane being moisture vapor transmissive, gas permeable, and wind and liquid penetration resistant; and
   a fluoropolymer coating disposed on surfaces of said nodes and fibrils defining the interconnecting passages in said membrane;
   said coating coalesced on surfaces of said nodes and fibrils to provide oil and surfactant resistance to said composite membrane without completely blocking pores in said membrane, said side chains extending in a direction away from said surfaces of said nodes and said fibrils
   said coating formed by:
      a dispersion of an oleophobic fluoropolymer diluted with a water-miscible wetting agent;
      said surfaces of said nodes and fibrils which define the pores in said membrane wetted with the diluted dispersion of the oleophobic fluoropolymer;
      the wetting agent removed from said membrane; and
      solids in the dispersion of the oleophobic fluoropolymer coalesced on surfaces that define pores in said membrane.

8. The composite membrane of claim 7 wherein said membrane is made from expanded polytetrafluoroethylene.

9. The composite membrane of claim 7 wherein said fluoropolymer comprises a perfluoroalkyl acrylic copolymer.

* * * * *